73-659 SR
E167A XR 2,703,203 fm 235-182

March 1, 1955 A. S. BISHOP 2,703,203

COMPUTER

Filed Feb. 21, 1946 2 Sheets-Sheet 1 solves linear differential equations computer sums different orders of differential terms.

INVENTOR.
AMASA S. BISHOP

BY M. O. Hayes

ATTORNEY

March 1, 1955 A. S. BISHOP 2,703,203

COMPUTER

Filed Feb. 21, 1946 2 Sheets-Sheet 2

INVENTOR.
AMASA S. BISHOP

BY M. O. Hayes

ATTORNEY 2,703,203

COMPUTER

Amasa S. Bishop, Novelty, Ohio, assignor, by mesne assignments, to the United States of America as represented by the Secretary of the Navy Application February 21, 1946, Serial No. 649,427

10 Claims. (Cl. 235—61)

This invention relates to electrical apparatus for generating particular waveforms, and more particularly to electrical apparatus for generating waveforms which are the solution of predetermined linear differential equations.

A primary object of the present invention is to provide various novel and selective combinations of differentiating circuits and differential amplifiers which generate waveforms which are the solution of linear differential equations.

Another object of the present invention is to provide various novel and selective combinations of differentiating circuits and differential amplifiers which generate voltages for indicating graphically the solution of linear differential equations.

The above and other objects will be apparent from the following specification when taken with the accompanying drawings in which.

Figure 1:
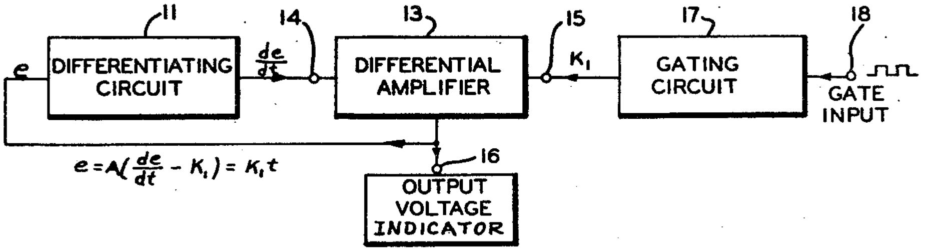
Fig. 1 is a block diagram of one form of the invention for generating a linear sweep voltage.

Referring to the drawings several novel combinations of differentiating circuits, differential amplifiers, and coupling devices are shown which provide as an output voltage a waveform that is the graphical solution of a linear differential equation. The combination shown in Fig. 1 produces a linear sweep voltage, $e=K_1t$ as the solution of the equation $de/dt=K_1$. The combination of Fig. 2 produces a parabolic waveform $e=K_1t^2$ as the solution of $d^2e/dt^2=K_1$. The circuits of Fig. 3 produce a sine wave voltage $e=\sin\sqrt{K_1}t$ as the solution of $$d^2e/dt^2=-K_1$$

Figure 4:
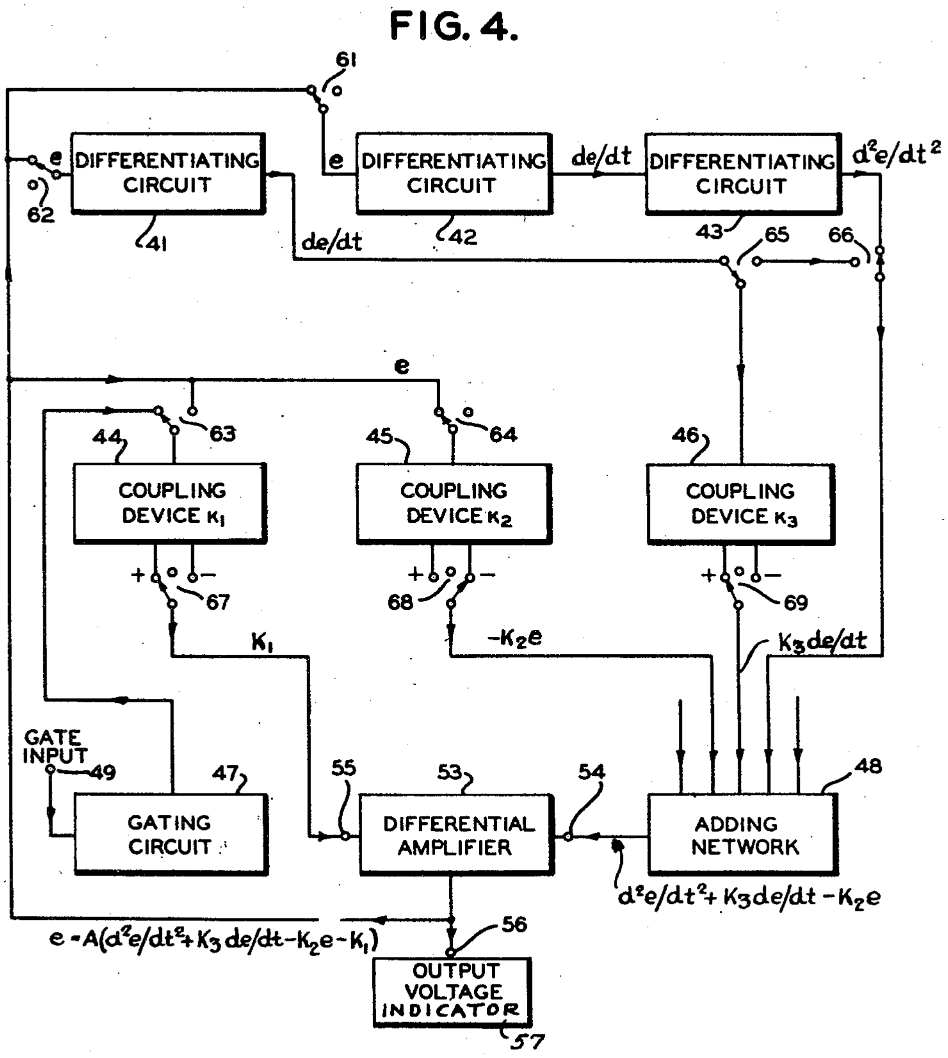
Fig. 4 is a block diagram of a general form of the invention for providing various selective combinations of differentiating circuits and differential amplifiers.

With the switches making connections as shown, the circuits of Fig. 4 produce a waveform which is the graphical solution of the differential equation $$d^2e/dt^2+K_3de/dt-K_2e=K_1$$

Figure 3:
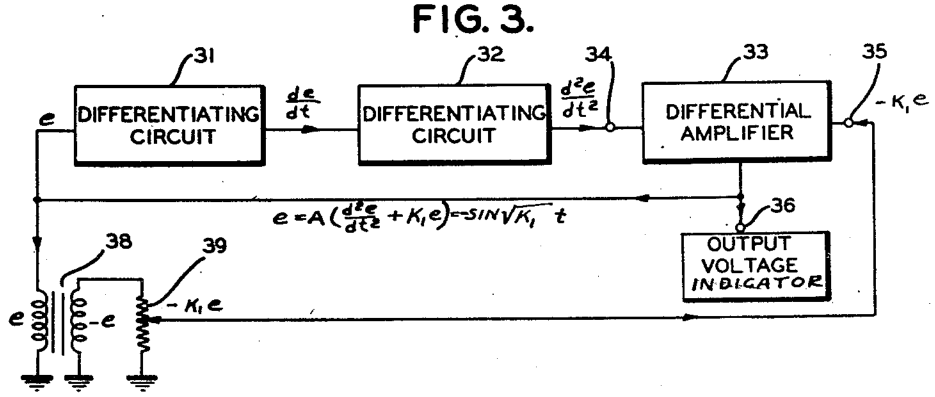
Fig. 3 is a block diagram of still another form of the invention for generating a sine wave of voltage.

The differentiating circuits, shown in the drawings, are conventional RC circuits having sufficient feedback which produce an output voltage, $de/dt$, when energized by an input voltage $e$. Such circuits are disclosed in Patent No. 2,251,973, issued August 12, 1941, to E. S. L. Beale et al., and Patent No. 2,324,797, issued July 20, 1943, to E. L. Norton. The differential amplifiers are conventional high gain amplifier circuits having two input voltages such as $de/dt$ and K and provide an output voltage, $A(de/dt-K)$ which is the difference of the input voltages amplified by the circuit gain A. Amplifiers of this general class are described in detail in "Radio Engineers Handbook," by Terman, published by McGraw-Hill Book Company, 1943, on pages 395 to 399. The coupling devices ($K_1$, $K_2$, and $K_3$ of Fig. 4) each comprise a conventional coupling circuit and variable means for establishing a fixed ratio K between input and output voltages. It is able to reverse the polarity of the output voltage when desired. Such a coupling device is shown in Fig. 3 as the combination of transformer 38 and potentiometer 39, and provides an output voltage $-Ke$ when energized by an input voltage $e$. The gating circuits used are conventional circuits of the nature disclosed in chapter 4 of "Ultra-High Frequency Techniques," by J. G. Brainerd et al., published May 1944, or in paragraphs 45 and 48 of "Radar Electronic Fundamentals," NavShips 900,016, published by the Bureau of Ships, Navy Department, in June 1944, which provide at their output a clamped or fixed potential during the interval of the gate voltage applied at their input. The gating circuits, in addition, set the boundary conditions for the solution of the equation thus limiting the output waveform as to time. Adding network 48, Fig. 4, has several input terminals and comprises a combination of conventional coupling circuits and is here assumed to produce no distortion or attenuation at its output terminal.

Referring more particularly to Fig. 1, a potential $e$ is applied to the input of differentiating circuit 11. The output, $de/dt$, of differentiating circuit 11 energizes input terminal 14 of differential amplifier 13. The other input terminal 15 is energized by the constant potential output $K_1$, of gating circuit 17 during the interval of the gate input applied at terminal 18. Differential amplifier 13 therefore provides an output voltage, $A(de/dt-K_1)$, at its output terminal 16, which output voltage is also coupled back as the input $e$, to differentiating circuit 11. Thus:

$$A(de/dt-K_1)=e$$

or by transposing, $$de/dt-K=e/A$$

Now if A is large, $e/A$ is negligible and therefore $$de/dt=K_1$$

the solution of which is a linear sweep voltage, $$e=K_1t+L$$

where L is a constant of integration which becomes zero when the circuits are properly clamped by gating circuit 17.

Figure 2:
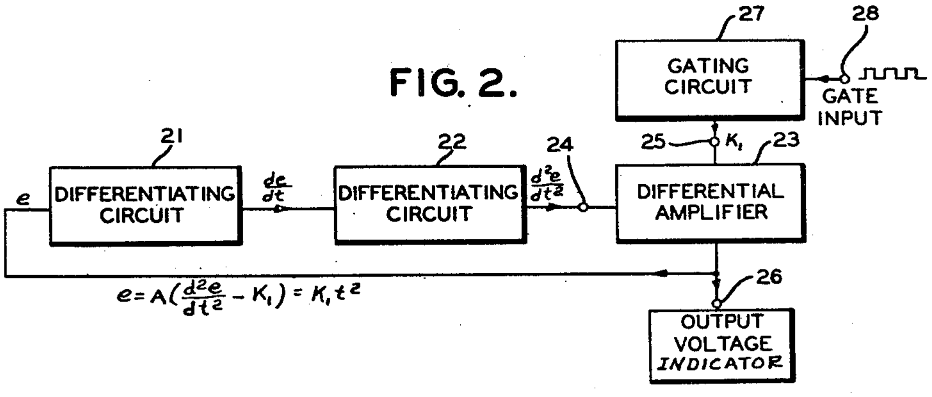
Fig. 2 is a block diagram of another form of the invention for generating a parabolic voltage waveform.

Referring to Fig. 2, another combination is shown of the elements disclosed in conjunction with Fig. 1, in which a second differentiating circuit is added. As in Fig. 1, an input voltage $e$ is applied to a first differentiating circuit 21. The output $de/dt$ of first differentiating circuit 21 energizes a second differentiating circuit 22. The output, $d^2e/dt^2$, of circuit 22 is applied to one input terminal 24 of differential amplifier 23. The other input terminal 25 is energized by the constant potential output $K_1$ of gating circuit 27 during the interval of the gate input applied at terminal 28. Differential amplifier 23 therefore provides at its output terminal 26 an output voltage, $$A(d^2e/dt^2-K_1)$$

which output voltage is also coupled back as the input $e$, to first differentiating circuit 21. Thus, $$A(d^2e/dt^2-K_1)=e$$

or by transposing $$(d^2e/dt^2-K_1)=e/A$$

Again, if A is large, $e/A$ is negligible and therefore, $$d^2e/dt^2=K_1$$

the solution of which is, $$e=K_1t^2+Lt+M$$

where L and M are constants of integration which are reduced to zero by proper clamping of the circuits. Thus the output voltage at terminal 26 is a parabolic waveform, $$e=K_1t^2$$

Referring to Fig. 3, still another combination of the above elements is shown. As in Fig. 2, the use of two differentiating circuits 31 and 32 provides upon application of input voltage, $e$, a voltage, $d^2e/dt^2$, at input terminal 34 of differential amplifier 33. Its output voltage at terminal 36 is coupled back as the input voltage, $e$, to circuit 31 and also through a coupling device comprising transformer 38 and potentiometer 39 to provide a voltage $-K_1e$ at the other input terminal 35 of differential amplifier 33. Thus its output voltage at terminal 36 is $$e=A(d^2e/dt^2+K_1e)$$

which becomes if A is large, $$d^2e/dt^2=-K_1e$$

which has the solution, $$e=\sin \sqrt{K_1}t$$

Thus a sine wave voltage is produced having a frequency $\sqrt{K_1}/2\pi$. It is to be noted that no gating circuit is shown in Fig. 3. In such a case a continuous sine wave output is produced. Groups of sine waves may be produced by the use of a gating circuit. Also suitable regenerative or clamping circuits (not shown) may be used to control the amplitude of the sine wave output.

Referring to Fig. 4, the above described elements are connected in still another combination by means of multi-position switches 61 through 69. When these switches have their poles in the positions shown in Fig. 4, the output voltage at terminal 56 is a waveform which is the graphical solution of a linear differential equation, $$d^2e/dt^2+K_3de/dt-K_2e=K_1$$

The mathematical demonstration of the above equation is similar to that used in conjunction with the circuits of Figs. 1, 2, and 3. The output voltage, *e*, at terminal 56 is applied, through switch 61, to the input of a first differentiating circuit 42 the output of which energizes a second differentiating circuit 43 which provides a voltage, $d^2e/dt^2$, to be applied at one input of adding network 48 through switch 66. The voltage, *e*, is also applied, through switch 62, to a third differentiating circuit 41 the output of which is coupled through switches 65 and 69 and $K_3$ couping device 46 to another input of adding network 48 to provide a voltage, $K_3de/dt$. The voltage, *e*, is also applied, through switches 64 and 68 and $K_2$ coupling device 45 (polarity reversed), to a third input of adding network 48 to provide a voltage, $-K_2e$. Due to the above mentioned inputs, the output of adding network 48 applies to input terminal 54 of differential amplifier 53 a voltage, $$d^2e/dt^2+K_3de/dt-K_2e$$

The other input terminal 55 is energized by a voltage $K_1$ during the interval of a gate input at terminal 49 of gating circuit 47. Thus the aforementioned output voltage at terminal 56 is:

$$e=A(d^2e/dt^2+K_3de/dt-K_2e-K_1)$$

and, if A is large, reduces to $$d^2e/dt^2+K_3de/dt-K_2e=K_1$$

The graphical solution of the above equation may be obtained by connecting a suitable indicating means 57 to output terminal 56, or the voltage waveform may be taken from terminal 56 for a sweep or other suitable use.

By proper use of switches 61 through 69 the elements of Fig. 4 can be reconnected so as to duplicate the circuits of Figs. 1, 2, and 3. To obtain the circuit of Fig. 1 from that of Fig. 4, switches 64, 65 and 66 are thrown to their other position, switches 62, 63, and 67 must be left in their positions as shown, and switches 61, 68 and 69 no longer are effective. Thus differentiating circuit 41 replaces 11, adding network 48 merely acts as a connecting device, differential amplifier 53 with input terminals 54 and 55 and output terminal 56 replaces differential amplifier 13 with input terminals 14 and 15 respectively and output terminal 16, and gating circuit 47 and $K_1$ coupling device 44 replace gating circuit 17. Likewise to obtain the circuit of Fig. 2, switches 62 and 64 are thrown to their other position, switches 61, 66, 63 and 67 are left in their positions as shown in Fig. 4, and switches 65, 68, and 69 are no longer effective. Similarly to obtain the circuit of Fig. 3, switches 62, 63, 64 and 67 are thrown to their other position, switches 61 and 66 are left in their positions as shown in Fig. 4, and switches 65, 68 and 69 are no longer effective.

The invention described in the foregoing specification need not be limited to the details shown, which are considered to be illustrative of only a few forms the invention may take. For example, Fig. 4 demonstrates only a few of the possible combinations of differentiating circuits and differential amplifiers for providing graphical solutions of linear differential equations. It is obvious to those skilled in the art that many other combinations of the above elements are possible to generate desired waveforms for any purpose. Also the circuits of Fig. 4 may be increased in complexity by the addition of more elements so as to be capable of yielding a graphical solution of any conceivable linear differential equation within the boundary conditions set by the gating circuits. For example, a large number of these elements may be made connectable by means of a suitable switchboard providing the necessary number of circuit combinations.

What is claimed is:

1. Electrical apparatus for solving a linear differential equation comprising, a first differentiating circuit having an input voltage, a second differentiating circuit energized by the output of said first differentiating circuit, a high gain differential amplifier energized by the output of said second differentiating circuit, means for coupling a fraction of said input voltage in opposite phase to energize said differential amplifier, the output of said differential amplifier providing said input voltage to said first differentiating circuit; and indicating means associated with said output of said differential amplifier providing a graphical solution of said differential equation.

2. Electrical apparatus comprising, in combination, a source of potentials, a plurality of differentiating circuits, means for switching a predetermined number of said differentiating circuits in series and/or in parallel, means for adding the outputs of said differentiating circuits, a differential amplifier, the added outputs of said differentiating circuits being applied to said differential amplifier, the output of said differential amplifier being applied to predetermined differentiating circuits, and switching means for applying a gated potential from said source to said differential amplifier.

3. An electronic computer for solving linear differential equations comprising, a high gain amplifier having input and output circuits, a differentiating feedback network adapted to provide a transient behavior varying with time in a manner described by the linear differential equation for which a solution is sought, means connecting the output circuit of said amplifier to the input of said network, means connecting the output of said network to the input circuit of said amplifier, a voltage source and means for periodically applying voltages from said source to said amplifier to limit the initial and final amplitudes of said amplifier output.

4. An electronic computer for solving linear differential equations comprising, a high gain amplifier having input and output circuits, a plurality of differentiating circuits, each delivering an output voltage substantially linearly proportional to the time derivative of an input voltage, means connecting said differentiating circuits in a network having a transient behavior varying with time in a manner described by a predetermined linear differential equation, means connecting the output circuit of said amplifier to the input of said network, means connecting the output of said network to the input circuit of said amplifier, a voltage source and means for periodically applying voltages from said source to said amplifier to limit the initial and final amplitudes of said amplifier output.

5. An electronic computer for solving a predetermined linear differential equation comprising, a high gain amplifier having input and output circuits, a plurality of differentiating circuits, each delivering an output voltage substantially linearly proportional to the time derivative of an input voltage, means interconnecting said differentiating circuits in a network functioning in accordance with a predetermined linear differential equation, means connecting the output circuit of said amplifier to the input of said network, means connecting the output of said network to the input circuit of said amplifier, a source of periodically rectangular voltage pulses, means for applying voltage pulses from said source to said amplifier to limit the initial and final amplitudes of said amplifier output.

6. An electronic computer for solving a predetermined linear differential equation comprising, a source of constant voltage, a high gain amplifier responsive to first and second input voltages to provide an output voltage proportional to the difference of said input voltages, means for periodically applying a voltage from said source to said amplifier as a first input voltage, a plurality of differentiating circuits, each adapted to produce an output voltage proportional to the derivative of time of an input voltage, means interconnecting said differentiating circuits to produce a network having a transient behavior varying with time in accordance with said predetermined linear differential equation, means applying the output of said amplifier to said network, and means applying the output of said network to said amplifier as a second input voltage, whereby the wave form of the output of said amplifier is a graphic solution to said predetermined linear differential equation between the limits imposed periodically by said first input voltage from said source.

7. An electronic computer for solving a first order linear differential equation comprising, a high gain amplifier having input and output circuits, a differentiating circuit having an output voltage substantially linearly proportional to the time derivative of an input voltage, means connecting the output of said amplifier to the input of said differentiating circuit, means applying the output of said differentiating circuit to the input circuit of said amplifier, a voltage source and means for periodically applying voltages from said source to said amplifier to limit the initial and final amplitudes of said amplifier output.

8. An electronic analogous computer for solving a second order linear differential equation comprising, a high gain amplifier having input and output circuits, a pair of differentiating circuits each having an output voltage substantially linearly proportional to the time derivative of an input voltage, means interconnecting said pair of differentiating circuits in a network having a transient behavior with time varying as the characteristics of said second order linear differential equation, means applying the output of said differentiating circuits to the input circuit of said amplifier, a voltage source and means for periodically applying voltages from said source to said amplifier to limit the initial and final amplitudes of said amplifier output.

9. An electronic computer for solving complex mathematical functions comprising, a source of voltages, a high gain electronic amplifier having input and output circuits, an electrical network whose output is related to its input in accordance with the mathematical function for which a solution is sought, means for connecting the output of said amplifier to the input of said network, means for applying the output of said network as a negative feedback voltage to the input of said amplifier, and means for periodically applying voltages of predetermined amplitude from said source to limit the initial and final amplitudes of said amplifier output.

10. An electronic computer for the graphic solution of complex mathematical functions comprising, a high gain electronic amplifier having input and output circuits, a source of voltages, means for applying voltages from said source to said amplifier input, an electrical network whose output is related to its input in accordance with the mathematical function for which a solution is sought, means for connecting the output of said amplifier to the input of said network, means for applying the output of said network as a negative feedback voltage to the input of said amplifier whereby said amplifier output voltage is driven to a wave form to yield a negative feedback voltage from said network equal in amplitude and phase to input voltages from said source, means for indicating the amplitude of said amplifier output as a function of time.

References Cited in the file of this patent

UNITED STATES PATENTS

| | | |
|---|---|---|
| 1,315,539 | Carson | Sept. 9, 1919 |
| 2,179,607 | Bedford | Nov. 14, 1939 |
| 2,232,076 | Newsam | Jan. 18, 1941 |
| 2,237,425 | Geiger et al. | Apr. 8, 1941 |
| 2,251,973 | Beale | Aug. 12, 1941 |
| 2,324,797 | Norton | Jan. 20, 1943 |
| 2,338,646 | Kessler | Jan. 4, 1944 |
| 2,367,116 | Goldsmith | Jan. 9, 1945 |
| 2,410,081 | Kenyon | Oct. 29, 1946 |
| 2,412,227 | Och et al. | Dec. 10, 1946 |
| 2,412,485 | Whiteley | Dec. 10, 1946 |
| 2,418,127 | Labin | Apr. 1, 1947 |
| 2,463,553 | Olesen | Mar. 8, 1949 |
| 2,511,197 | Darlington | June 13, 1950 |
| 2,548,532 | Hedeman | Apr. 10, 1951 |